United States Patent
Critz et al.

(10) Patent No.: US 7,079,830 B2
(45) Date of Patent: *Jul. 18, 2006

(54) INFORMATION HANDLING SYSTEM WITH WIRELESS LAN AND WIRED LAN ACTIVITY MONITORING APPARATUS AND METHODOLOGY

(75) Inventors: Christian L. Critz, Georgetown, TX (US); Yong Chen, Round Rock, TX (US); Thomas B. Shu, Austin, TX (US); Nikolai Vyssotski, Elgin, TX (US)

(73) Assignee: Dell Products L.P., Round Rock, TX (US)

( * ) Notice: Subject to any disclaimer, the term of this patent is extended or adjusted under 35 U.S.C. 154(b) by 739 days.

This patent is subject to a terminal disclaimer.

(21) Appl. No.: 10/056,378

(22) Filed: Jan. 24, 2002

(65) Prior Publication Data

US 2003/0154311 A1    Aug. 14, 2003

(51) Int. Cl.
*H04Q 7/20* (2006.01)

(52) U.S. Cl. ............... 455/403; 455/412.2; 455/550.1; 455/557

(58) Field of Classification Search ............... 455/403, 455/422.1, 446, 7, 9, 412.2, 550.1, 551, 74, 455/557; 370/338, 328, 345; 345/179; 715/772, 715/846; 709/227, 230, 250, 218, 219; 340/825.36, 340/825.49
See application file for complete search history.

(56) References Cited

U.S. PATENT DOCUMENTS

| | | | |
|---|---|---|---|
| 4,415,921 A | 11/1983 | Mulvanny et al. | 358/139 |
| 4,458,331 A | 7/1984 | Amezcua et al. | 364/900 |
| 4,978,317 A | 12/1990 | Pocrass | 439/490 |
| 5,103,402 A | 4/1992 | Morton et al. | 364/485 |
| 5,155,600 A | 10/1992 | Maeda | 358/310 |
| 5,289,394 A | 2/1994 | Lapeyre | 364/709.12 |
| 5,378,052 A | 1/1995 | Yoshino | 303/3 |
| 5,533,117 A | 7/1996 | Kim | 379/377 |
| 5,613,873 A | 3/1997 | Bell, Jr. | 439/490 |
| 5,654,726 A | 8/1997 | Mima et al. | 345/2 |
| 5,778,398 A | 7/1998 | Nagashima et al. | 707/501 |
| 5,815,158 A | 9/1998 | Lubachevsky et al. | 345/427 |

(Continued)

OTHER PUBLICATIONS

Printed material from www.macwindows.com/keytips.html "Tips for Sharing Keyboards and Monitors" by Henry Norr dated Oct. 31, 2001.

*Primary Examiner*—Jean Gelin
(74) *Attorney, Agent, or Firm*—Haynes and Boone, LLP

(57) ABSTRACT

An information handling system is provided which includes a wired network controller fixedly mounted in the system and an optional wireless network card which is pluggably receivable by a connector in the system. The system includes a first indicator for annunciating network activity and a second indicator for annunciating that the link is good as well as its link rate. Status processing logic is situated between the wireless card connector, the network controller and the first and second indicators to permit the wireless card and the network controller to share the first and second indicators.

14 Claims, 2 Drawing Sheets

U.S. PATENT DOCUMENTS

| | | | |
|---|---|---|---|
| 5,828,663 A * | 10/1998 | Ikegami | 370/347 |
| 5,874,931 A | 2/1999 | Drake et al. | 345/51 |
| 5,896,532 A | 4/1999 | Blewett | 395/680 |
| 5,983,117 A * | 11/1999 | Sandler et al. | 455/557 |
| 6,025,846 A | 2/2000 | Chudley | 345/419 |
| 6,031,510 A | 2/2000 | Drake et al. | 345/50 |
| 6,084,553 A | 7/2000 | Walls et al. | 345/1 |
| 6,088,005 A | 7/2000 | Walls et al. | 345/4 |
| 6,256,318 B1 * | 7/2001 | O'Callaghan et al. | 370/447 |
| 6,295,197 B1 * | 9/2001 | Watts et al. | 361/683 |
| 6,654,616 B1 * | 11/2003 | Pope et al. | 455/445 |
| 6,757,543 B1 * | 6/2004 | Moran et al. | 455/456.1 |
| 6,804,536 B1 * | 10/2004 | Bultman | 455/557 |
| 2002/0072391 A1 * | 6/2002 | Itoh et al. | 455/557 |

\* cited by examiner

INFORMATION HANDLING SYSTEM WITH WIRELESS LAN AND WIRED LAN ACTIVITY MONITORING APPARATUS AND METHODOLOGY

BACKGROUND

The disclosures herein relate generally to information handling systems and more particularly to monitoring the activity of such a system in a wireless or hard-wired network.

Information handling systems such as portable computers are frequently equipped with an integrated network controller referred to as "LAN on motherboard" or LOM network controller. The LOM network controller enables the user to easily connect to a wired network without the need to install additional hardware. It is noted that this is a wired connection. However, more recently, wireless information handling systems have become popular. To provide wireless communication capability, these systems can be equipped with a so-called RF modem which typically plugs into a mating connector in the system.

Many users desire the ability monitor the status of their network connection, whether it be wired or wireless. One conventional approach to monitoring the wired connection is to equip the system with a network connector jack which includes 2 LED indicators, namely one LED to monitor the activity of the connection, the other LED to monitor the speed of the connection. For example, it is common to use an RJ-45 connector wherein one LED glows yellow to indicate activity on the wired network connection. The second LED is often capable of glowing 2 different colors to indicate different network speeds. For example, when the second LED is green, it may indicate a 10 Mbps wired connection, and when the second LED is amber, it may indicate a 100 Mbps wired connection.

Many wireless system users also desire the ability to monitor their wireless connection. One way is to add dedicated activity and link speed indicators to the system. However, this increases the cost of the overall system due first to the expenses associated with providing systems with 2 different mechanical covers and second to an overall increase in the parts count for the system.

What is needed is a mechanism and methodology for providing status monitoring of the wireless connection of the system as well as the wired connection without increasing the number of indicators.

SUMMARY

Accordingly, in one embodiment an information handling system is provided including a processor, a memory coupled to the processor and a connector for receiving an optional wireless card. A fixed network controller is situated in the system. The system further includes first and second indicators which are shared between the wireless card and the fixed network controller. Status processing logic is situated between the wireless card, the fixed network controller and the first and second indicators to achieve this indicator sharing arrangement.

A principal advantage of the embodiment disclosed herein is the lower cost achieved by sharing of the first and second indicators and the avoidance of designing two different cases for the system, i.e. one case with indicators for a fixed network controller version only and another case for a fixed network controller and wireless card combination.

DETAILED DESCRIPTION

Figure 1:
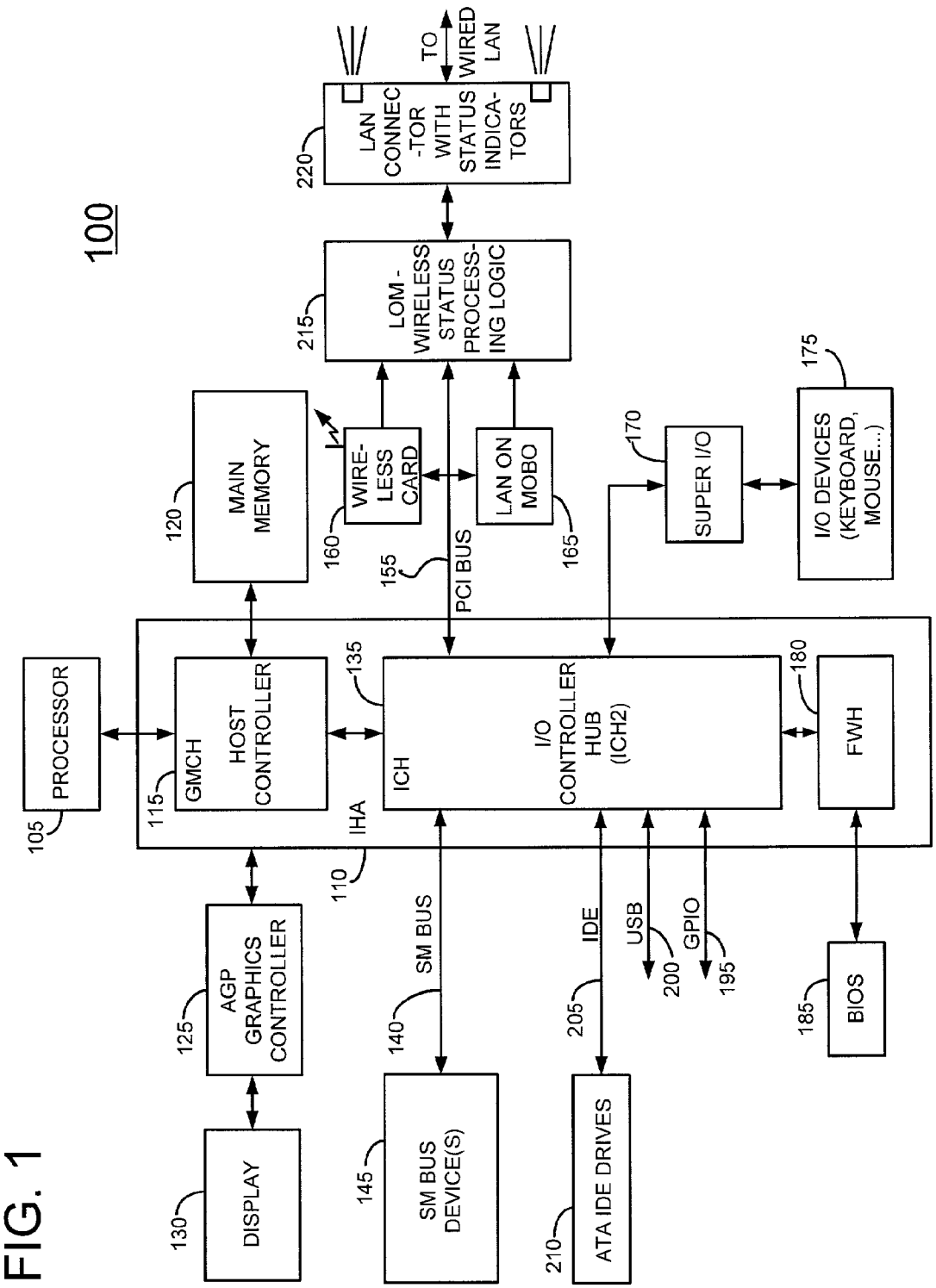
FIG. 1 is a high level block diagram of the information handling system employing the disclosed network monitoring apparatus

FIG. 1 depicts a high level block diagram of an information handling system 100 in which the disclosed technology is practiced. An information handling system is defined as an instrumentality or aggregate of instrumentalities primarily designed to compute, classify, process, transmit, receive, retrieve, originate, switch, store, display, manifest, detect, record, reproduce, handle, or utilize any form of information, intelligence or data for business, scientific, control or other purposes.

The particular information handling system 100 depicted in FIG. 1 is a portable computer system. However the disclosed technology can be practiced on other systems as well, such as desktop, server, and both smaller and larger systems. Computer system 100 includes a processor 105 currently available at different clocking rates, for example, 1.0 GHz, 1.13 GHz and 1.2 GHz.

An Intel Hub Architecture (IHA) chip 110 provides system 100 with memory and I/O functions. More particularly, IHA chip 110 includes a Graphics and AGP Memory Controller Hub (GMCH) 115. GMCH 115 acts as a host controller that communicates with processor 100 and further acts as a controller for main memory 120. GMCH 115 also provides an interface to Advanced Graphics Port (AGP) controller 125 which is coupled thereto. A display 130 is coupled to AGP controller 125. IHA chip 110 further includes an I/O Controller Hub (ICH) 135 which performs numerous I/O functions. ICH 135 is coupled to a System Management Bus (SM Bus) 140 which is coupled to one or more SM Bus devices 145.

A super I/O controller 170 is coupled to ICH 135 to provide connectivity to input devices such as a keyboard and mouse 175 as shown in FIG. 1. A firmware hub (FWH) 180 is coupled to ICH 135 to provide an interface to system BIOS 185 which is coupled to FWH 180. A General Purpose I/O (GPIO) bus 195 is coupled to ICH 135. USB ports 200 are coupled to ICH 135 as shown. USB devices such as printers, scanners, joysticks, etc. can be added to the system configuration on this bus. An integrated drive electronics (IDE) bus 205 is coupled to ICH 135 to connect IDE drives 210 to the computer system.

ICH 135 is coupled to a Peripheral Component Interconnect (PCI) bus 155. A removable wireless card (RF modem) 160 is coupled to PCI bus 155 by a mini PCI connector (not shown). Since wireless card 160 is generally a plug-in card, it is physically accessed through an opening in the system's case or by opening a door or panel (not shown). In other embodiments, the wireless card is not generally user accessible within the system's case. A network controller 165 (LAN ON MOBO) is situated on the motherboard and coupled to PCI bus 155 as shown. Network controller 165 is generally situated within the system's case and is considered to be an internal fixed device. Network controller 165 is generally soldered to the motherboard on which the components of the system are situated. Both wireless card 160

(when present) and network controller 165 (LAN ON MOBO) are coupled to LOM-Wireless Status Processing Logic 215. Processing logic 215 is coupled to LAN Connector With Status Indicators 220. The operation of processing logic 215 and connector/status indicators 220 will be discussed in more detail subsequently with reference to FIG. 2.

Figure 2:
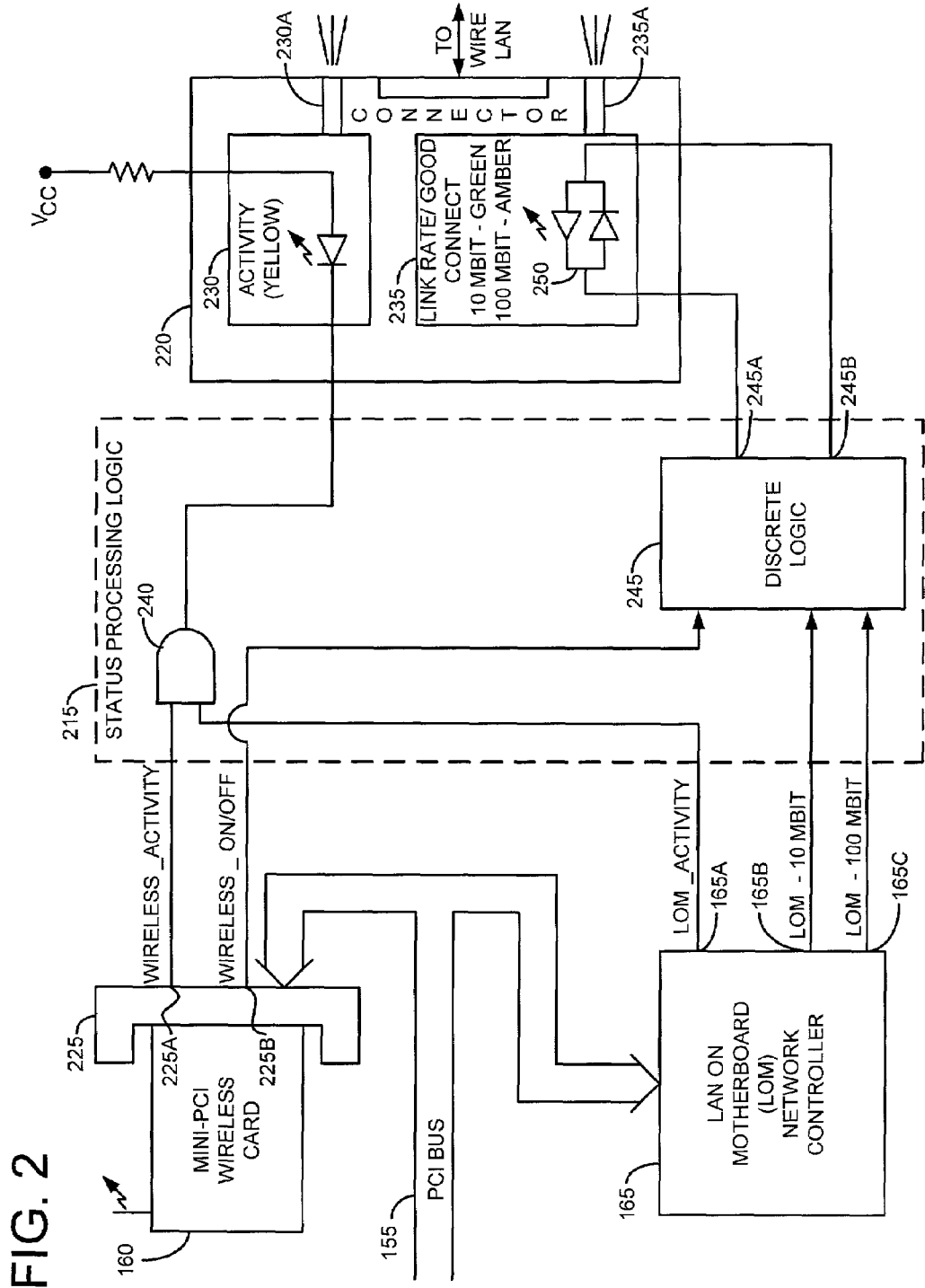
FIG. 2 is a more detailed block diagram showing the disclosed network status monitoring portion of the information handling system.

FIG. 2 is a more detailed block diagram showing the disclosed network monitoring portion of the information handling system. Both the mini-PC wireless modem card 160 and LOM network controller 165 are coupled to PCI bus 155. Mini-PCI wireless card 160 is plugged into mini-PC connector 225 as shown. Depending on the user's preference, some systems may come with wireless card 160 pre-installed within the system's case while it may absent in other systems. One card which can be employed as wireless card 160 is a card meeting IEEE spec. 802.11, although other RF modem cards can be employed as well.

As will now be discussed, status processing logic 215 processes information from both wireless card 160 and LOM network controller 165 to enable wireless card 160 and controller 165 to share the same status indicators in LAN connector 220. In one embodiment, LAN connector 220 includes status indicator 230, such as a light emitting diode (LED) which glows yellow to indicate "activity". A light pipe 230A conducts the yellow light from the LED to an opening where it is visible to the user. LAN connector 220 also includes a "link rate" indicator 235. Link rate indicator 235 is a dual color indicator, essentially a green LED and an amber LED sharing a common lens and light pipe 235A. When link rate indicator 235 is green, either wireless card 160 or LOM controller 165 is operating at a first link rate, for example 10 Mbps. However, when link rate indicator 235 is amber, either wireless card 160 or LOM controller 165 is operating at 100 Mbps. Currently, wireless cards generally operate at 10 Mbps. However, in the future wireless cards are likely to operate at higher link rates, such as 100 Mbps and beyond. One type of connector that is suitable for use as LAN connector 220 is an RJ-45 type connector.

To enable sharing of status indicators 230 and 235 by both wireless card 160 and LOM network controller 165, status processing logic 215 manipulates the signals from wireless card 160 and LOM controller 165 in the manner now described. Wireless connector 225 includes a WIRELESS_ACTIVITY output 225A at which a WIRELESS ACTIVITY signal is present. The WIRELESS_ACTIVITY signal is "active low" meaning that when it has a 0 value, wireless activity is indicated. Conversely, if the WIRELESS_ACTIVITY signal has a 1 value, there is no wireless activity. LOM controller 165 includes a LOM_ACTIVITY output 165A at which a LOM_ACTIVITY signal is present. The LOM_ACTIVITY signal is also "active low" meaning that when it has a 0 value, LOM activity is indicated. Conversely, if the LOM ACTIVITY signal has a 1 value there is no LOM activity.

The WIRELESS_ACTIVITY signal and the LOM_ACTIVITY signal are AND'd together at AND gate 240 as shown, the resulting output of which drives activity indicator 230. Consequently, when either the WIRELESS_ACTIVITY signal or the LOM_ACTIVITY signal goes low, indicator 230 turns on. This makes the user aware of activity. While implemented as an AND circuit, since active lows are employed as the two inputs, the AND gate behaves substantially as a logical NAND according to the following truth table designated TRUTH TABLE 1.

TRUTH TABLE 1

| WIRELESS_ACTIVITY | LOM_ACTIVITY | ACTIVITY INDICATOR 230 ON (YELLOW) |
|---|---|---|
| 0 | 0 | 1 |
| 0 | 1 | 1 |
| 1 | 0 | 1 |
| 1 | 1 | 0 |

Wireless connector 225 includes a WIRELESS_ON/OFF output 225B at which a WIRELESS_ON/OFF signal is present. This signal indicates if the wireless card (if present) is on or off. The WIRELESS_ON/OFF signal is provided to discrete logic circuit 245 as shown in FIG. 2. Here 0 indicates off and 1 indicates on. LOM controller 165 includes output 165B and 165C at which a LOM_10 MBIT signal and a LOM_100 MBIT signal are present, respectively. If LOM_10 MBIT is high, this indicates that LOM controller 165 is operating at 10 Mbps, whereas if LOM_100 MBIT is high, this indicates that LOM controller 165 is operating at 100 Mbps, The outputs 245A and 245B of discrete logic 245 drive link rate indicator 235 to turn on either the 10 MBIT-GREEN indicator or the 100 MBIT AMBER indicator in lowing truth table designated TRUTH TABLE 2:

TRUTH TABLE 2

|  | WIRELESS_ON/OFF | LOM_10 MBIT | LOM_100 MBIT | 10 MBIT GREEN | 100 MBIT AMBER |
|---|---|---|---|---|---|
|  | 0 | 0 | 0 | OFF | OFF |
|  | 0 | 0 | 1 | OFF | ON |
|  | 0 | 1 | 0 | ON | OFF |
|  | 1 | 0 | 0 | ON | OFF |
| * | 1 | 0 | 1 | OFF | ON |
| * | I | 1 | 0 | ON | OFF |
| ** | 1 | 1 | 1 | X | X |

\* - LOM has priority over wireless
\*\* - NOT a possible state

In TRUTH TABLE 2, 0 indicates off and 1 indicates on. Logic 245 processes the input signals provided thereto such that if WIRELESS_ON/OFF is 0 (wireless card is off) and LOM_10 MBIT and LOM 100 MBIT are both 0, then both the 10 MBIT GREEN and 100 MBIT AMBER indicators are off.

If the LOM_100 MBIT signal is 1 (or on), then the 100 MBIT AMBER indicator is on and the 10 MBIT GREEN indicator is off regardless of whether the WIRELESS_ON/OFF is 0 (off) or 1 (on). This is true regardless of the state of the WIRELESS_ON/OFF signal since logic 245 permits LOM controller 165 to override wireless card 160 with respect to the indicators. In other words, when connector 230 is coupled to a wire-based LAN as opposed the system being coupled to a wireless LAN via wireless card 160, then LOM controller 165 overrides the wireless card and controls the indicators 235 on connector 220. Similarly, if the LOM_10 MBIT signal is 1 (or on), then the 10 MBIT GREEN indicator is on and the 100 MBIT indicator is off regardless of the state of the WIRELESS_ON/OFF signal.

In one typical scenario where the user is operating in wireless mode, the user is not connected to a network by a wired network cable plugged into the wall, the WIRELESS_ON/OFF will be 1 (on). In this case, the user will be apprised that the wireless link is good by a GREEN indication from the GREEN/AMBER LED 250 and will receive activity information from the YELLOW LED 230.

In another operational scenario, when the user is operating in wired LAN mode (i.e. when connector 220 is plugged into a wire LAN), the user is apprised that the link is good by observing either a GREEN indication from GREEN/AMBER LED 250 or an AMBER indication from GREEN/AMBER LED 250. Concurrently, the user observes the speed of the connection by observing if the indicator LED 250 is green or amber.

As can be seen, a principal advantage of these embodiments is the provision of a technology which permits an information handling system to indicate both activity and link rate information (speed and link good) for both LOM controllers and wireless modems without providing indicators beyond those ordinarily needed for the LOM controller alone. While this novel methodology has been described with reference to an information handling system such as a portable computer, the disclosed methodology also applies to other electrical devices such as personal digital assistants (PDA's), cellular and other telephone devices, satellite receivers, home entertainment systems, electronic gaming equipment, configurable automotive electronic devices, etc., and combinations thereof. Such devices have become so processor dependent that they are considered to be computer systems and indeed are information handling systems.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in a manner consistent with the scope of the embodiments disclosed herein.

What is claimed is:

1. An information handling system comprising:
   a processor;
   a memory coupled to the processor;
   a connector for receiving an optional wireless card;
   a fixed network controller situated in the system;
   first and second indicators situated in the system and shared between the wireless card and the fixed network controller; and
   a status processing logic circuit coupling the wireless card and the fixed network controller to the first and second indicators such that the first indicator indicates network activity, wherein the second indicator includes first and second sub-indicators for indicating different link rates, respectively, and the status processing logic circuit drives the first indicator to indicate a first link rate when the system is operating at a first link rate and drives the second indicator to indicate a second link rate when the system is operating at a second link rate.

2. The information handling system of claim 1 wherein the status processing logic circuit coupled to the second indicator enables the second indicator to indicate a good wireless network connection or a good fixed network controller connection.

3. The information handling system of claim 1 wherein the status processing logic circuit causes the fixed network controller to override the wireless device sharing of the first and second indicators when the fixed network controller is connected to a wire LAN thus providing access of the fixed network controller to the first and second indicators instead of the wireless device.

4. An information handling system comprising:
   a processor;
   a memory coupled to the processor;
   a connector for receiving an optional wireless card;
   a fixed network controller situated in the system; and
   first and second indicators situated in the system and shared between the wireless card and the fixed network controller, wherein the first and second indicators are integrated in a wire LAN connector, and wherein the second indicator includes first and second sub-indicators for indicating different link rates, respectively, and the status processing logic circuit drives the first indicator to indicate a first link rate when the system is operating at a first link rate and drives the second indicator to indicate a second link rate when the system is operating at a second link rate.

5. The information handling system of claim 4 further comprising a motherboard to which the fixed network controller is permanently attached.

6. The information handling system of claim 4 further comprising a motherboard to which the connector for the optional wireless card is attached, the wireless card being pluggably attachable to the connector for the optional wireless card.

7. The information handling system of claim 4 wherein the connector is a mini-PCI connector.

8. The information handling system of claim 4 wherein the wireless card is a mini-PCI wireless card.

9. A method of operating an information handling system comprising:
   providing a first indicator;
   providing a second indicator;
   sharing the first indicator between a fixed network controller situated in the information handling system and a wireless device which is pluggable into a wireless device receiving connector in the information handling system; and
   sharing the second indicator between the fixed network controller and the wireless device, wherein the first and second indicators are situated in a wire LAN connector, and wherein the fixed network controller overrides the wireless device sharing of the first and second indicators when the wire LAN connector is connected to a wire LAN thus providing access of the fixed network controller to the first and second indicators instead of the wireless device.

10. The method of claim 9 wherein the wireless device is removable from the system.

11. The method of claim 9 wherein the first indicator indicates network activity.

12. A method of operating an information handling system comprising:
   providing a first indicator;
   providing a second indicator;
   sharing the first indicator between a fixed network controller situated in the information handling system and a wireless device which is pluggable into a wireless device receiving connector in the information handling system; and
   sharing the second indicator between the fixed network controller and the wireless device, wherein the second indicator indicates a good wireless network connection or a good fixed network controller connection, and wherein the second indicator includes first and second sub-indicators for indicating different link rates, respectively.

13. The method of claim 12 wherein the wireless device receiving connector is a mini-PCI connector.

14. The method of claim 12 wherein the wireless device is a mini-PCI wireless device.

* * * * *